United States Patent
Salter et al.

(10) Patent No.: US 12,358,441 B2
(45) Date of Patent: Jul. 15, 2025

(54) METHOD OF FABRICATING CONSOLE WITH GROUNDED TRIM RING

(71) Applicant: Ford Global Technologies, LLC, Dearborn, MI (US)

(72) Inventors: Stuart C. Salter, White Lake, MI (US); Paul Kenneth Dellock, Northville, MI (US); Richard Gall, Ann Arbor, MI (US); Satyanarayana Raju Vemulapati, Westland, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 532 days.

(21) Appl. No.: 17/951,194

(22) Filed: Sep. 23, 2022

(65) Prior Publication Data

US 2023/0014649 A1  Jan. 19, 2023

Related U.S. Application Data

(62) Division of application No. 17/218,552, filed on Mar. 31, 2021, now Pat. No. 11,485,297, which is a
(Continued)

(51) Int. Cl.
*B60R 13/02* (2006.01)
*B32B 27/08* (2006.01)
(Continued)

(52) U.S. Cl.
CPC .......... *B60R 13/0206* (2013.01); *B32B 27/08* (2013.01); *B60K 35/10* (2024.01); *B60R 7/06* (2013.01); *B60R 11/0235* (2013.01); *B60R 11/0258* (2013.01); *B60R 11/0264* (2013.01); *B60K 2360/771* (2024.01); *B60R 2011/0005* (2013.01); *B60R 2013/0287* (2013.01)

(58) Field of Classification Search
CPC ....... B32B 27/08; B32B 27/304; B60K 35/10; B60K 2360/771; B60R 13/0206; B60R 11/0235; B60R 11/0264; B60R 11/0258
See application file for complete search history.

(56) References Cited

U.S. PATENT DOCUMENTS

| | | |
|---|---|---|
| 9,731,657 B1 | 8/2017 | Salter et al. |
| 10,011,223 B1 | 7/2018 | Salter et al. |

(Continued)

FOREIGN PATENT DOCUMENTS

| | | |
|---|---|---|
| CN | 103265811 A | 8/2013 |
| CN | 103554900 A | 2/2014 |

OTHER PUBLICATIONS

Jim Skelly, Technically Speaking, "Decorative Plating Processes for Common Plastic Resins," Jun. 2008, pp. 61-65, Lufkin, Texas.

*Primary Examiner* — Alonzo Chambliss
(74) *Attorney, Agent, or Firm* — Vichit Chea; Price Heneveld LLP

(57) ABSTRACT

A vehicle console includes a trim ring disposed over a periphery of a housing. The trim ring includes a polymeric material and is electrically conductive and grounded. A proximity switch assembly is retained in the housing. The proximity switch assembly includes a proximity sensor proximate a sensing pad for generating an activation field. The sensing pad is proximate the trim ring.

12 Claims, 8 Drawing Sheets

Related U.S. Application Data division of application No. 16/545,711, filed on Aug. 20, 2019, now Pat. No. 10,994,670, which is a division of application No. 15/856,648, filed on Dec. 28, 2017, now Pat. No. 10,427,622.

(51) Int. Cl.
*B60K 35/10* (2024.01)
*B60R 7/06* (2006.01)
*B60R 11/02* (2006.01)
*B60R 11/00* (2006.01)

(56) References Cited

U.S. PATENT DOCUMENTS

| | | | |
|---|---|---|---|
| 9,956,898 | B1 | 8/2018 | Dellock et al. |
| 10,059,238 | B1 | 8/2018 | Salter et al. |
| 10,124,767 | B1 | 11/2018 | Salter et al. |
| 10,128,836 | B1 | 11/2018 | Buttolo et al. |
| 10,279,664 | B1 | 5/2019 | Gardner |
| 10,427,622 | B2 | 10/2019 | Salter et al. |
| 10,461,746 | B2 | 10/2019 | Buttolo et al. |
| 10,994,670 | B2 * | 5/2021 | Salter ................ B60R 11/0264 |
| 11,485,297 | B2 * | 11/2022 | Salter ........................ B60R 7/06 |
| 2012/0048708 | A1 | 3/2012 | Salter et al. |
| 2012/0049870 | A1 | 3/2012 | Salter et al. |
| 2013/0271204 | A1 | 10/2013 | Salter et al. |
| 2014/0002405 | A1 | 1/2014 | Salter et al. |
| 2014/0252879 | A1 | 9/2014 | Dassanayake et al. |
| 2014/0306723 | A1 | 10/2014 | Salter et al. |
| 2014/0306724 | A1 | 10/2014 | Dassanayake et al. |
| 2015/0180471 | A1 | 6/2015 | Buttolo et al. |
| 2015/0229305 | A1 | 8/2015 | Buttolo et al. |
| 2015/0298607 | A1 | 10/2015 | Salter et al. |
| 2016/0112044 | A1 | 4/2016 | Salter et al. |
| 2016/0274664 | A1 | 9/2016 | Buttolo et al. |
| 2016/0344386 | A1 | 11/2016 | Buttolo et al. |
| 2017/0106564 | A1 | 4/2017 | Hwang et al. |
| 2017/0178837 | A1 | 6/2017 | Jeong |
| 2017/0296686 | A1 | 10/2017 | Cole |
| 2018/0265043 | A1 | 9/2018 | Salter et al. |
| 2018/0297513 | A1 | 10/2018 | Salter et al. |
| 2018/0302088 | A1 | 10/2018 | Majkowski et al. |
| 2018/0304805 | A1 | 10/2018 | Villacres et al. |
| 2018/0319331 | A1 | 11/2018 | Salter et al. |
| 2020/0083886 | A1 | 3/2020 | Vemulapati et al. |
| 2020/0233540 | A1 | 7/2020 | Salter et al. |

* cited by examiner

METHOD OF FABRICATING CONSOLE WITH GROUNDED TRIM RING

CROSS-REFERENCE TO RELATED APPLICATIONS

This application is a divisional of and claims priority to U.S. patent application Ser. No. 17/218,552, now U.S. Pat. No. 11,485,297, filed on Mar. 31, 2021, entitled "CONSOLE WITH GROUNDED TRIM RING," which is a divisional of and claims priority to U.S. patent application Ser. No. 16/545,711, filed on Aug. 20, 2019, now U.S. Pat. No. 10,994,670, entitled "CONSOLE WITH GROUNDED TRIM RING," which is a divisional of and claims priority to U.S. patent application Ser. No. 15/856,648, filed on Dec. 28, 2017, now U.S. Pat. No. 10,427,622, entitled "CONSOLE WITH GROUNDED TRIM RING," the disclosures of which are hereby incorporated herein by reference in their entireties.

FIELD OF THE DISCLOSURE

The present disclosure generally relates to consoles, and more particularly relates to consoles having a grounded trim ring.

BACKGROUND OF THE DISCLOSURE

Consoles, such as consoles that contain vehicle controls, provide a location for activation buttons for lights, climate control settings, sound systems, and other vehicle features. Some activation buttons may be proximity switches with electric fields. Consoles sometimes include visually appealing decorative trim. Some decorative trim components may be conductive.

Console design considerations include material selection based on material properties such as conductivity, resistivity, melting point, ease of fabrication, and affordability. Further, console design considerations encompass arrangement of conductive trim components relative to components with electric fields. Improvements in console design, function, and material selection are always desired.

SUMMARY OF THE DISCLOSURE

According to one aspect of the present disclosure, a vehicle console includes a trim ring disposed over a periphery of a housing. The trim ring is made of a polymeric material and is electrically conductive and grounded. A proximity switch assembly is retained in the housing. The proximity switch assembly includes a proximity sensor proximate a sensing pad for generating an activation field. The sensing pad is proximate the trim ring.

Embodiments of the first aspect of the disclosure can include any one or a combination of the following features:
  a lamp, wherein the proximity switch assembly is provided on the lamp;
  the housing comprises a bezel with an aperture;
  the sensing pad comprises a lens disposed in the aperture;
  the proximity sensor is a capacitive sensor;
  the trim ring encircles the sensing pad;
  the trim ring is electrically coupled to a conductive support and wherein the conductive support is electrically coupled to a PCB;
  the trim ring comprises a heat stake pin that is connected to the conductive support;
  the housing is a first polymeric material and the trim ring is a second polymeric material;
  the second polymeric material is an acryloninitrile butadiene styrene (ABS) comprising approximately 0.5% to approximately 2% volume multi-walled carbon nanotubes and approximately 4% to approximately 6% volume high aspect ratio carbon black;
  the acryloninitrile butadiene styrene (ABS) comprising approximately 0.5% to approximately 2% volume multi-walled nanotubes and approximately 4% to approximately 6% volume high aspect ratio carbon black has a surface resistivity of approximately $0.8 \times 10^5$ ohm/sq to approximately $1.2 \times 10^5$ ohm/sq; and/or
  the housing and the trim ring are made during a two shot molding process.

According to another aspect of the present disclosure, a housing assembly for a proximity sensor includes a base coupled to a vehicle surface. The base holds the proximity sensor between a lens and a printed circuit board (PCB). The proximity sensor is coupled to the PCB and generates an activation field disposed proximate the lens. The housing assembly includes a conductive portion proximate the activation field. The conductive portion is grounded.

Embodiments of the second aspect of the disclosure can include any one or a combination of the following features:
  the base has a higher surface resistivity than the conductive portion; and/or
  the conductive portion comprises chrome plating.

According to another aspect of the present disclosure, a method of making a vehicular trim assembly includes the steps of forming a housing assembly of a first substrate and a second substrate wherein the first substrate has a higher electrical resistivity than the second substrate and electroplating the second substrate.

Embodiments of the third aspect of the disclosure can include any one or a combination of the following features:
  placing a proximity switch assembly having a selectively generated activation field within the housing assembly;
  conductively coupling the second substrate to a printed circuit board ground to prevent the second substrate from disrupting the selectively generated activation field;
  the first substrate is a first ABS material and the second substrate is a second ABS material comprising approximately 0.5% to approximately 2% volume multi-walled carbon nanotubes and approximately 4% to approximately 6% volume high aspect ratio carbon black and having a surface resistivity of approximately $0.8 \times 10^5$ ohm/sq to approximately $1.2 \times 10^5$ ohm/sq;
  etching a surface of the second substrate with chromic acid;
  rinsing the surface;
  coating the surface with copper;
  coating the copper with nickel;
  coating the nickel with chrome;
  etching an A-surface of the second substrate with chromic acid;
  rinsing the A-surface;
  coating the A-surface with copper;
  coating the copper with nickel;
  coating the nickel with chrome; and
  using a two shot molding process to form the housing assembly of the first substrate and the second substrate.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

Figure 1:
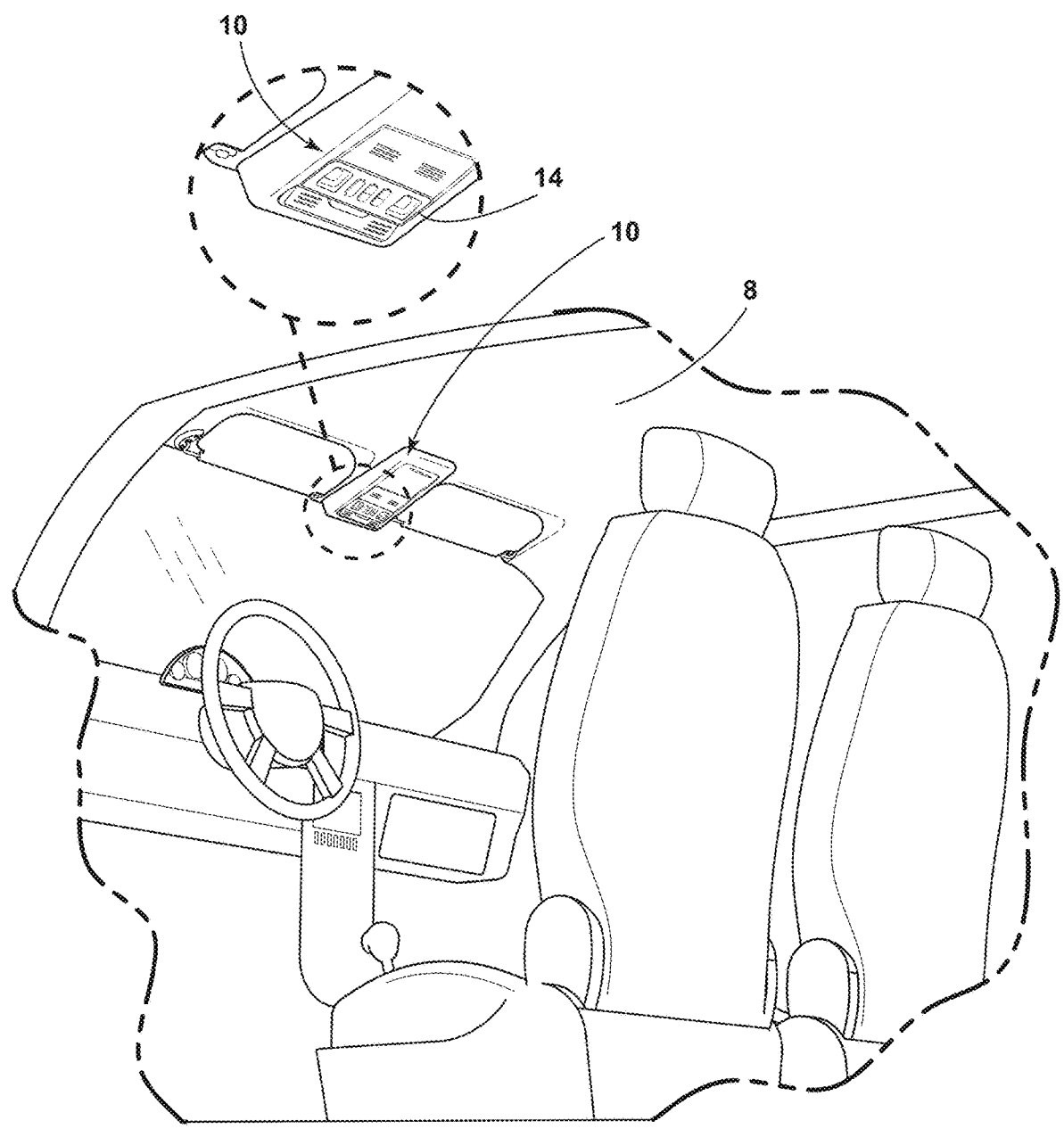
FIG. 1 is a perspective view of a passenger compartment of an automotive vehicle having an overhead console employing a grounded trim ring, according to one embodiment.
Figure 2:
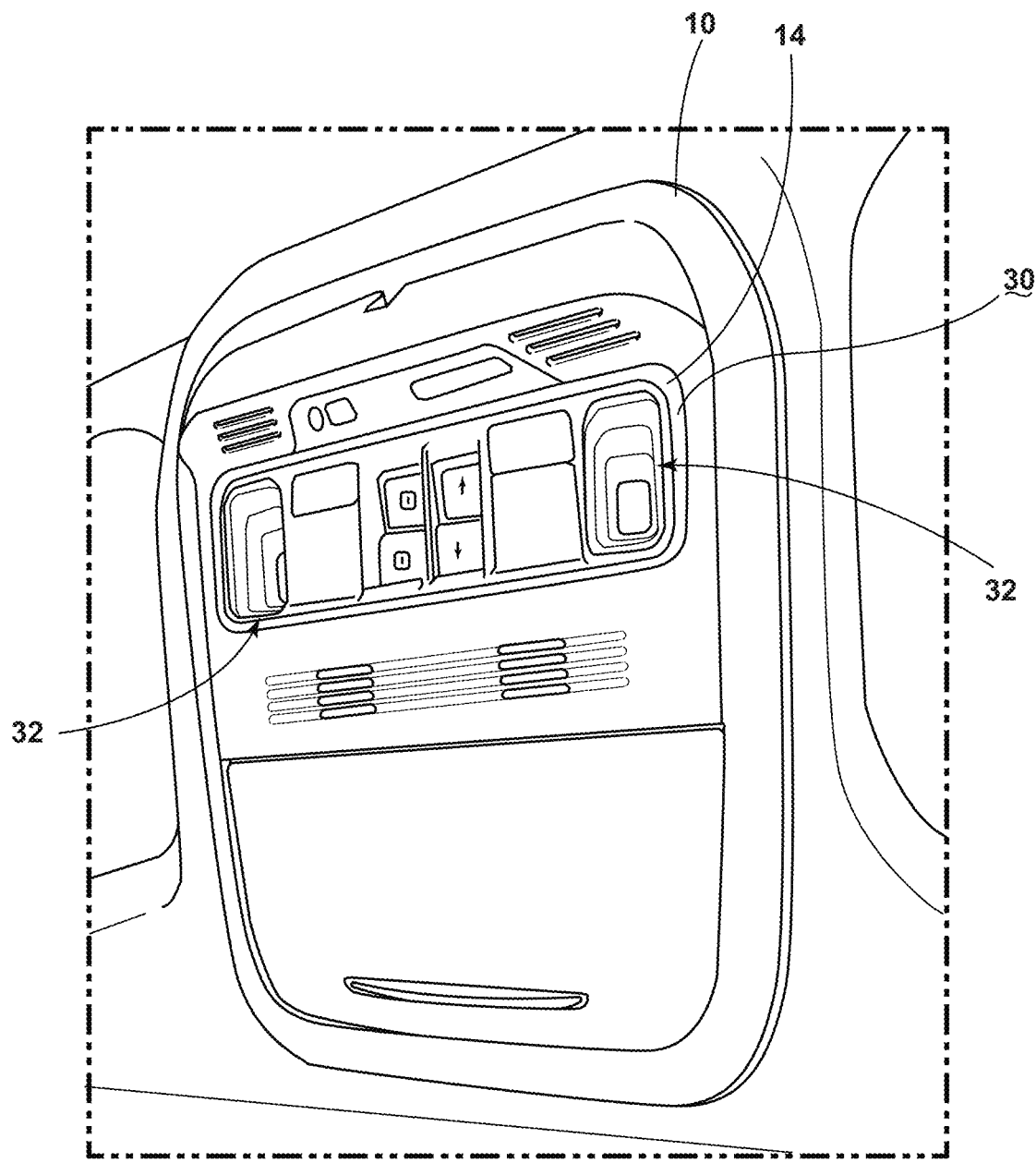
FIG. 2 is an enlarged view of the overhead console of FIG. 1, further illustrating the grounded trim ring.
Figure 3:
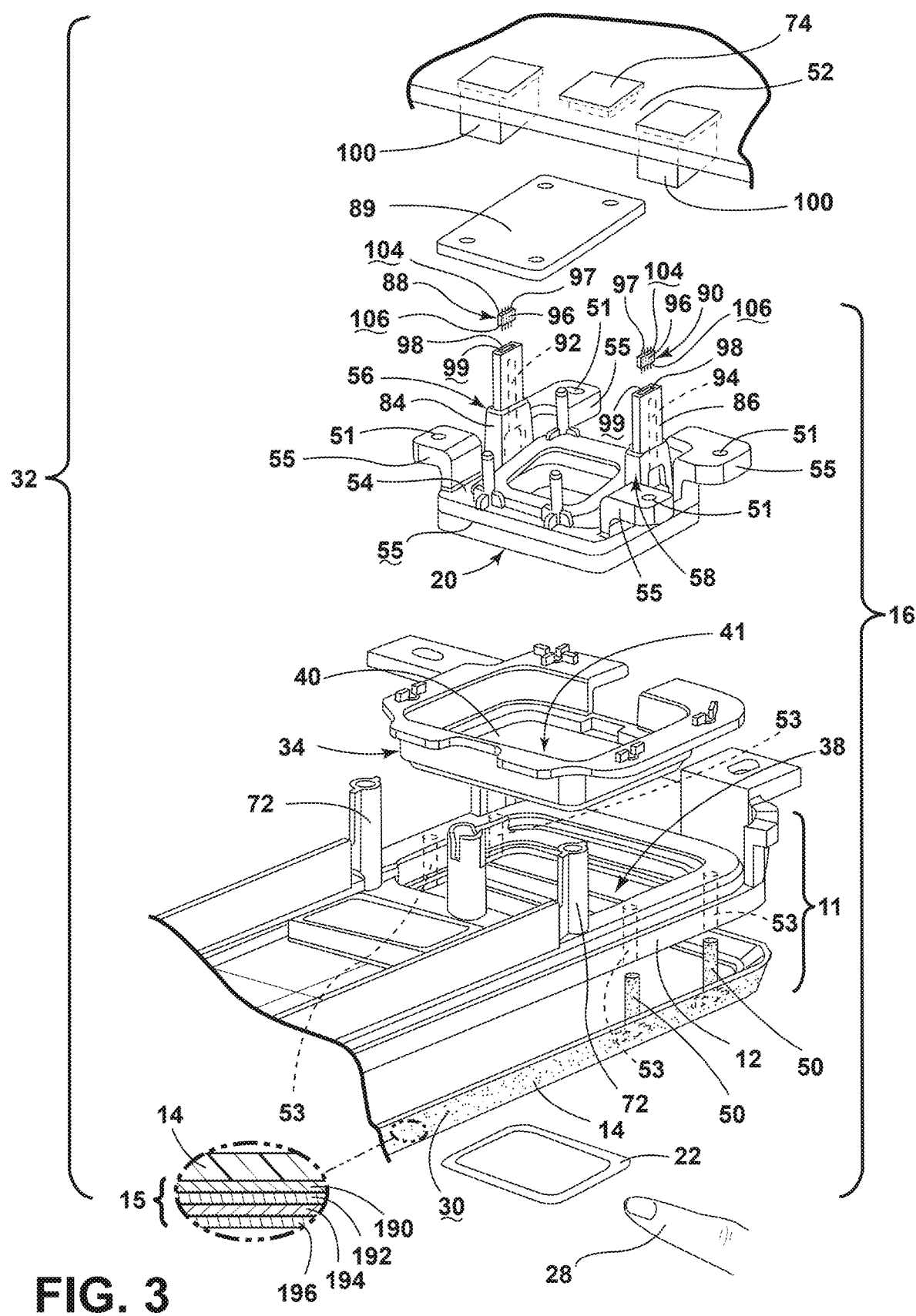
FIG. 3 is an exploded view of one side of the housing assembly, proximity switch assembly, and lamp assembly located in the overhead console of FIG. 1, according to one embodiment.

Referring to FIGS. 1-3, a vehicle console 10 includes a trim ring 14 disposed over a periphery of the housing 12. The trim ring 14 is made of a polymeric material and is electrically conductive and grounded. A proximity switch assembly 16 is retained in the housing 12. The proximity switch assembly 16 includes a proximity sensor 20 proximate a sensing pad (e.g., lens 40) for generating an activation field 22. The sensing pad (e.g., lens 40) is proximate the conductive trim ring 14.

Referring again to FIGS. 1-3, the interior passenger compartment of an automotive vehicle 8 is generally illustrated having a console 10 with a decorative trim ring 14. In the depicted embodiment, the decorative trim ring 14 is chrome plated on its exposed surface 30. The decorative trim ring 14 is part of a housing assembly 11 that includes a housing 12 and the decorative trim ring 14. The console 10 also includes a pair of lamp assemblies 32, each configured to include a proximity switch 34 and retained in the console 10 by the housing assembly 11, according to one embodiment. In the depicted embodiment, the housing 12 is a bezel with an aperture 38 for receiving a sensing pad (lens 40 in the depicted embodiment) of each lamp assembly 32.

Referring to FIGS. 1-8, it is desirable that the grounded trim ring 14 not interfere with the activation field 22 of the proximity switch 34. For example, a user touching the grounded trim ring 14 with finger 28 should not disturb the activation field 22 and activate the proximity switch 34 to switch the light source 74 on or to switch the light source 74 off. According to one embodiment, the base or housing 12 of the housing assembly 11 is made of a first polymeric material, and the trim ring 14, including heat stake pins 50, is made of a second polymeric material (improved platable ABS material 155). Properties of the second polymeric material typically include (1) electrical conductivity to ground the electroplated layers 190, 192, 194, and 196 disposed on the conductive trim ring 14 to the circuit board 52, through conductive support 54, and (2) low surface resistivity (electrical) for typically allowing successful electroplating of layers 190, 192, 194, 196 onto the trim ring 14.

Referring again to FIG. 3, each of the pair of lamp assemblies 32 that fit within the housing 12 apertures 38 provides an integral assembly of a lamp and a proximity switch 34 for activating a light source 74 to turn the lamp on and off. Each lamp assembly 32 includes an outer lens 40 having a light transparent window 41, a light source 74 disposed behind the outer lens 40 to illuminate light through the transparent window 41 of the outer lens 40, and a proximity switch 34 having one or more proximity sensors 20 disposed proximate or near a perimeter of the transparent window 41 of the outer lens 40. The one or more proximity sensors 20 generate an activation field 22 proximate the transparent window 41 of the outer lens 40 to sense activation of the proximity switch 34 to control activation of the light source 74. Internal lens 89 is disposed proximate to light source 74. In the embodiment shown, the proximity switch 34 is integrally assembled as part of the lamp assembly 32 in which the central portion, including the transparent window 41, of the outer lens 40 serves as a touch or sensing pad. The user may contact the sensing pad (outer lens 40) or come into close proximity therewith to be detected by the activation field 22. However, it should be appreciated that the proximity switch 34 may be assembled separate from the lamp assembly 32 and employ its own sensing pad and may control any of a number of devices or functions.

Each proximity switch 34 provided in each lamp assembly 32 is shown and described herein as a capacitive switch, according to one embodiment. Each proximity switch 34 includes a proximity sensor 20 that provides a sense activation field 22 to sense contact or close proximity of an object, such as a user's finger 28, in close relation to the proximity sensor 20, such as a tap or swiping motion by a user's finger 28. Thus, the sense activation field 22 generated by the proximity sensor 20 of each proximity switch 34 is a capacitive field in the exemplary embodiment, and the user's finger 28 has electrical conductivity and dielectric properties that cause a change or disturbance in the sense activation field 22 which is detected in a signal generated from the activation field 22.

According to one embodiment, the conductive support 54 may be formed of an electrically conductive metal material. The metal may be plated on the conductive support 54. The metal conductive support 54 is coupled to a pair of electrodes within sensor 20 that produce the activation field 22. The activation field 22 generated by the proximity sensor 20 extends below the transparent window 41 of the outer lens 40 to enable an object, such as a user's finger 28, hand or other body part to enter the activation field 22 at the sensing pad (lens 40) to activate the light source 74 on and off. When an object, such as finger 28 sufficiently engages the activation field 22 below the sensing pad, e.g., outer lens 40, a disturbance in the activation field 22 is detected such that activation of the proximity switch 34 is initiated so as to either switch the light source 74 on or switch the light source 74 off.

Sensor 20 is coupled to a first plated signal line 84 and a second plated signal line 86. The first and second plated signal lines 84 and 86 are electrically connected to circuitry in the circuit board 52. In the depicted embodiment, the first and second plated signal lines 84 and 86 are depicted as chrome plated towers 56 and 58, respectively, that connect to the circuit board 52 with conductive rubber interfaces 88, 90. In one embodiment, the conductive rubber interfaces 88, 90 consist of silicone rubber 96 and gold-plated metal wires 97 embedded into the silicone rubber 96. The gold-plated metal wires 97 are generally arranged in a vertical direction within the silicone rubber 96 between a grounded connection on the circuit board 52 proximate connectors 100 and a bathtub-shaped recess 98 in the top of each tower 56 and 58. The gold-plated metal wires 97 project from the silicone rubber 96 top surface 104 to electrically connect to connectors 100 and the gold-plated metal wires 97 project from the silicone rubber's bottom surface 106 to electrically connect with the chrome-plated bathtub-shaped recesses 98 in chrome-plated towers 56 and 58. In the depicted embodiment, the gold-plated metal wires 97 typically contact the bottom surface 99 of the bathtub recess 98. Thus, gold-plated metal wires 97 electrically connect the connectors 100 to the chrome-plated towers 56 and 58. The A pulsed drive input signal (e.g., voltage) is applied to one of the signal lines 84 and 86, and an output voltage proportional to the capacitance is received on the other of the signal lines 84 and 86. The output signal and the input signal may be processed by control circuitry, such as a controller, to determine whether an object, such as a user's finger 28, is sufficiently interacting with the activation field 22 to activate the proximity switch 34.

According to one embodiment, the electrically conductive material forming the sensor 20 and the first and second plated signal lines 84 and 86 may be formed of a chrome that is plated onto a thermoplastic polymer such as a polycarbonate (PC) or acrylonitrile butadiene styrene (ABS) material. The sensor 20 and the plated signal lines 84 and 86 may all be formed on the conductive support 54 in a single electroplating process. The process may include a vacuum metallization process, according to one embodiment. The plated signal lines 84 and 86 may be formed extending from contact with a first electrode and a second electrode of the sensor 20, via plated holes 92 and 94 and extending through legs or towers 56 and 58 of the conductive support 54 and into contact with the respective conductive rubber interfaces 88, 90 and connectors 100 on the circuit board 52. As such, electrically conductive signal lines are formed connecting each of the electrodes of sensor 20 to one of the towers 56 and 58. Towers 56 and 58, in turn, electrically connect to the circuit board 52 through the conductive rubber interfaces 88, 90 and to connectors 100. As such, control circuitry on the circuit board 52 may provide an electrical signal to one of the electrodes and may receive a signal from the other of the electrodes and process the signal to determine activation of the switch. In the depicted embodiment, the chrome plating forms an electrically conductive signal path extending from each of the electrodes, through the conductive rubber interfaces 88, 90 and to the circuit board 52. The underlying polymeric material is a dielectric and is electrically insulated. It should be appreciated that other shapes and sizes and techniques may be employed for providing a signal path extending from the electrodes of sensor 20 to the control circuitry on the circuit board 52.

Figure 4:
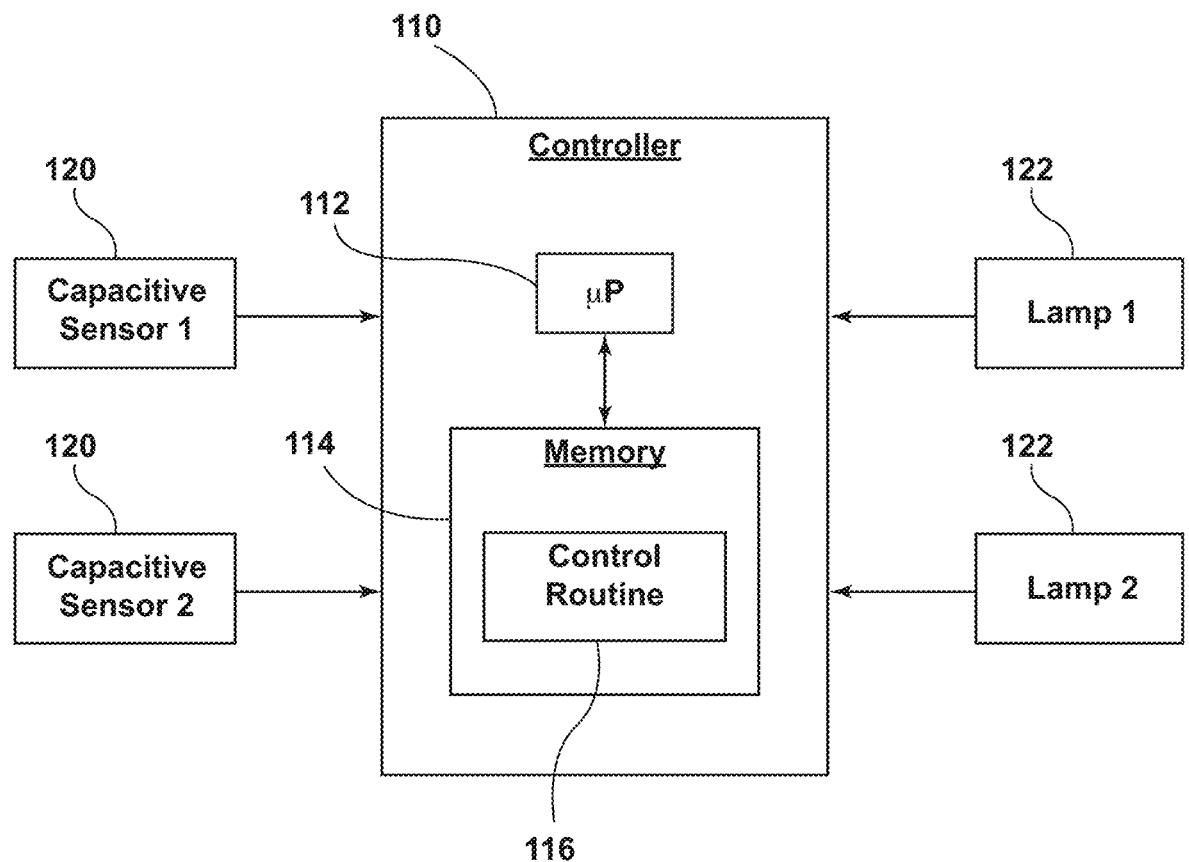
FIG. 4 is a block diagram illustrating a controller for controlling a lamp assembly based on the proximity switch, according to one embodiment.

The proximity switch 34 may include control circuitry as shown in FIG. 4, according to one embodiment. Included is a controller 110 having a microprocessor 112 and memory 114. The controller 110 may execute one or more control routines 116 as is known in the art via the processor 112 to process capacitor sensor inputs from capacitive sensors 120 and control corresponding devices shown as lamp 1 and lamp 2, each labeled 122. The controller 110 may process the capacitive signals sensed by each of the sensors 120 and compare the sensor values to thresholds to determine activation of the corresponding switch 34 indicative of activating one or more control devices, such as one of the lamps or light sources 74.

Figure 5:
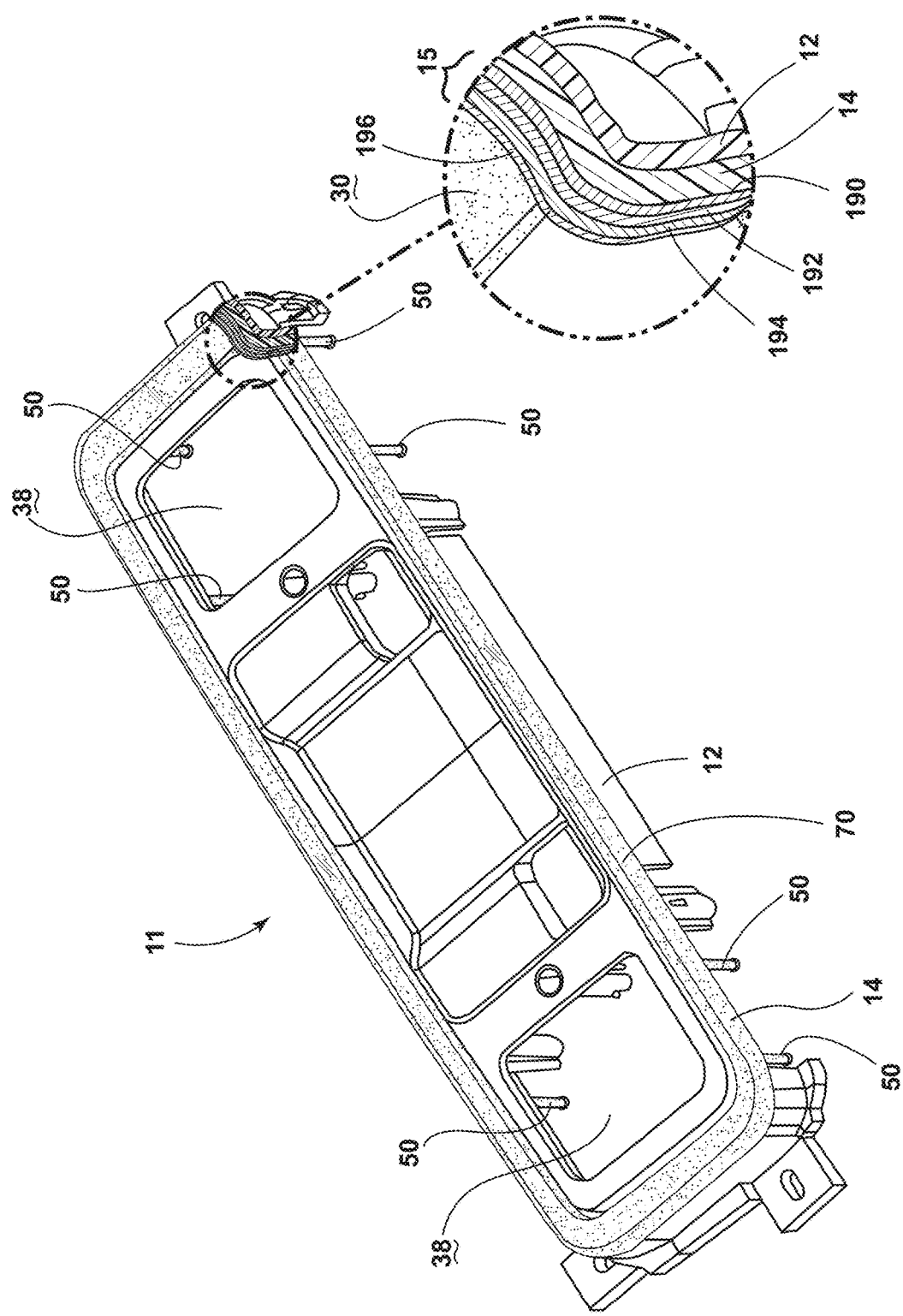
FIG. 5 is a perspective view of the housing assembly including a base and the trim ring with a metal layer, according to one embodiment.
Figure 6:
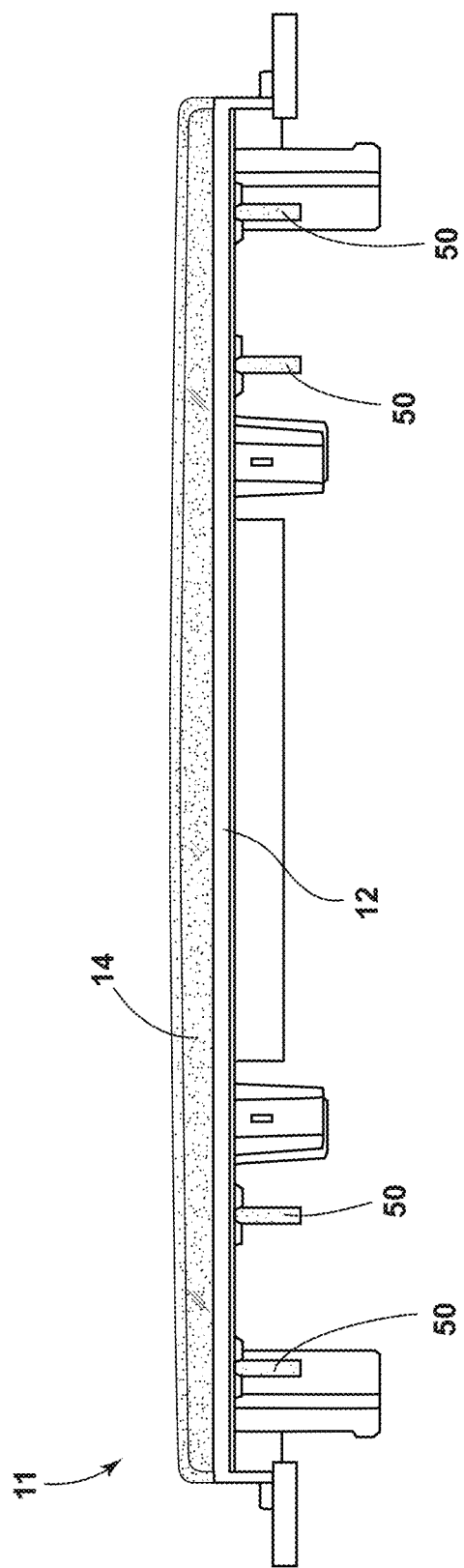
FIG. 6 is a side view of the housing assembly of FIG. 5.

Referring to FIGS. 3, 5, and 6, the housing assembly 11 is shown. The housing assembly 11 includes a base portion (housing 12) and a conductive trim ring portion (conductive trim ring 14). The conductive trim ring portion includes heat stake pins 50. Apertures 38 are provided in the housing 12 for receiving proximity switch sensing pads, such as outer lenses 40. The housing assembly 11 may be two-shot molded with a first substrate for the housing 12 and a second substrate for the conductive trim ring 14. In the depicted embodiment, the conductive trim ring 14 includes an electroplated metal layer 15. The metal layer 15 includes a copper layer 190, a semi-bright nickel layer 192, a bright nickel layer 194, and a chrome layer 196 according to one embodiment.

Referring now to FIGS. 5-7C, in one embodiment, the housing 12 is made of a non-platable ABS resin and the trim ring 14 is made of a platable ABS resin. A typical platable ABS resin has a surface resistivity greater than $1 \times 10^{15}$ ohm/sq so that it is a very good insulator that dissipates electrical charge that is creating capacitive interference. In the depicted embodiment, the conductive trim ring 14 is made of an improved platable ABS material 155 that has a surface resistivity of approximately $0.8 \times 10^5$ ohm/sq to approximately $1.2 \times 10^5$ ohm/sq and is composed of approximately 0.5% to approximately 2% multi-walled carbon nanotubes and approximately 4% to approximately 6% volume high aspect ratio carbon black. In various embodiments, the surface resistivity of the improved platable ABS material 155 may be less than $1 \times 10^6$ ohms/sq. The improved platable ABS material 155 with a surface resistivity less than $1 \times 10^6$ ohms/sq is more electrically conductive than the typical platable ABS resin with a surface resistivity greater than $1 \times 10^{15}$ ohms/sq. The electrical conductivity of the improved platable ABS material 155 that comprises the trim ring 14 (including heat stake pins 50) allows the metal layer 15 that is plated onto the trim ring 14 to ground the trim ring 14 to circuit board 52 through support 54.

Figure 7A:
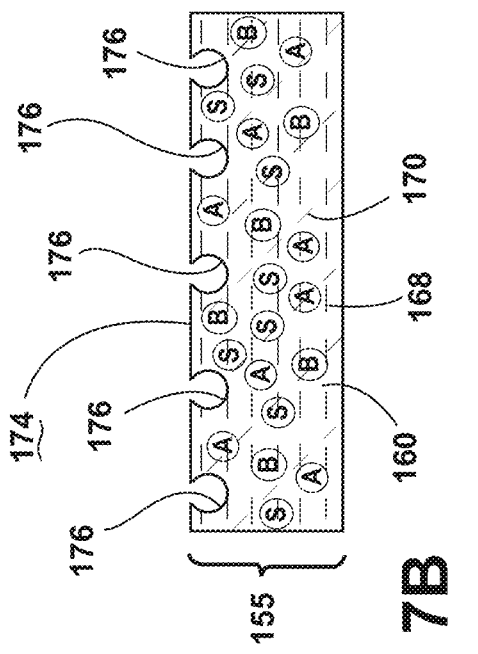
FIG. 7A is a schematic view of an improved polymeric material that may be used in the trim ring, according to one embodiment.
Figure 7B:
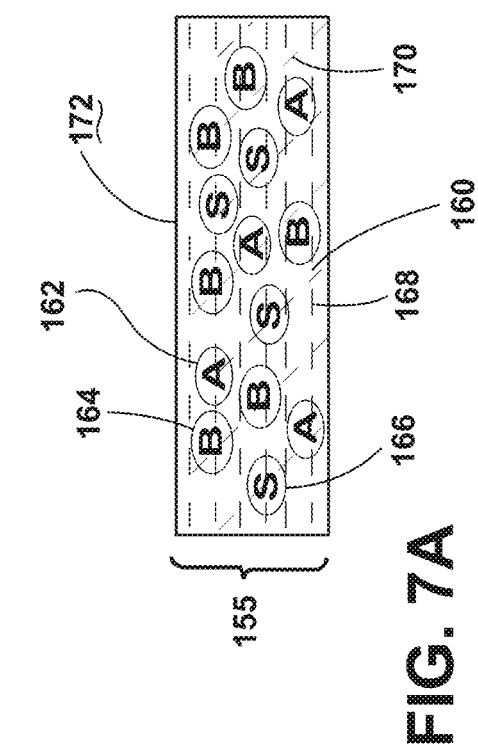
FIG. 7B is a schematic view of the improved polymeric material of FIG. 7A after an acid etch, according to one embodiment.
Figure 7C:
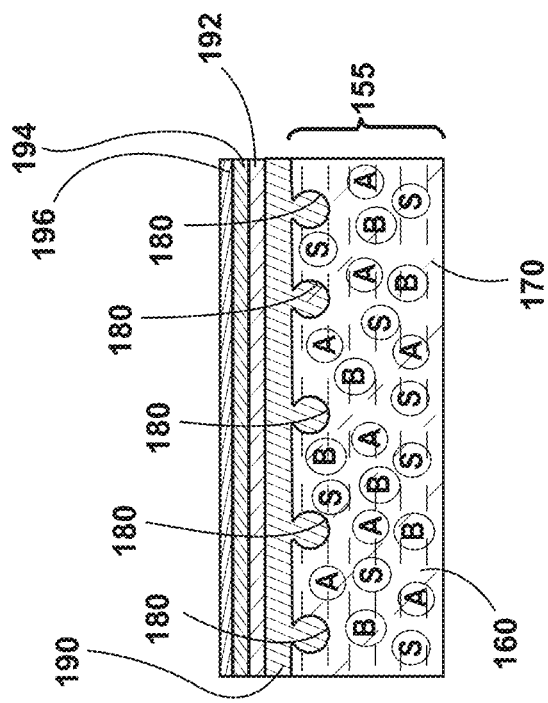
FIG. 7C is a schematic view of the improved polymeric material of FIGS. 7A and 7B after electroplating, according to one embodiment.

Referring now to FIGS. 7A-7C, schematic diagrams illustrate improved platable ABS material 155 and the process of electroplating improved platable ABS material 155. Generally, to impart electrical conductivity to a thermoplastic polymer resin that is nonconductive, carbon nanotubes and carbon black may be added to the thermoplastic polymer resin. A resin composition that incorporates the carbon nanotubes and the carbon black may be molded. Generally, a resin that has carbon nanotubes and carbon black molded into it typically has lower surface resistivity than a resin that does not have carbon nanotubes and carbon black molded into it. The lower surface resistivity improves electroplating efficiency. In one embodiment, the improved platable ABS material 155 is an ABS resin with roughly one percent volume multi-walled carbon nanotubes and roughly five percent volume high aspect ratio carbon black and a surface resistivity of about $1\times10^5$ ohm/sq.

FIG. 7A is a schematic representation of the improved platable ABS material, designated as identifier 155, prior to commencement of the electroplating process. The improved platable ABS material 155 includes an ABS resin 160 with acrylonitrile (A) 162, butadiene (B) 164, and styrene (S) 166, carbon black 168, and multi-walled carbon nanotubes 170. With reference to FIG. 7B, the improved platable ABS material 155 is shown after chromatic acid has been applied to the surface 172 of the improved platable ABS material 155 shown in FIG. 7A. As shown in FIG. 7B, the chromatic acid has removed the butadiene (B) 164 phase from the ABS resin 160 near the etched surface 174 of the ABS resin 160 to form voids 176 where carbon black 168 and multi-walled carbon nanotubes 170 are not present. When the carbon black 168 and multi-walled carbon nanotubes 170 are located in the ABS resin 160, they allow the chromatic acid to remove the butadiene (B) 164 to form voids 176. The multi-walled carbon nanotubes 170 are present in sufficient quantities to stop the carbon black 168 from reaching the surface 172 of the ABS resin 160 and blocking the butadiene (B) 164 from leaving the ABS resin 160. Referring to FIG. 7C, a copper layer 190 is applied over etched surface 174 of the ABS resin 160 in FIG. 7B. The copper layer 190 fills the voids 176 in the etched surface 174. Bonds 180 form between the copper layer 190 and the ABS resin 160. The quantity and location of the bonds 180 between the copper layer 190 and the ABS resin 160 typically contribute to a substantially smooth, substantially defect free outer appearance of the chrome layer 196 at trim ring surface 30. Referring again to FIG. 7C, a semi-bright nickel layer 192 is applied over the copper layer 190, a bright nickel layer 194 is applied over the semi-bright nickel layer 192, and a chrome layer 196 is applied over the bright nickel layer 194.

Carbon nanotubes are allotropes of carbon with a cylindrical nanostructure. Cylindrical carbon nanotubes contain cylindrical carbon molecules with unusual properties, which are valuable in developing materials with extraordinary conductivity. Multi-walled carbon nanotubes consist of more than one wall of graphene rolled into a tube. Carbon nanotubes have a three dimensional tubular molecular structure. Depending on the exact molecular nanotube, a carbon nanotube may be highly conductive or semi-conductive along a tubular axis. Published papers indicate that nanotubes can carry an electric current density of $4\times10^9$ A/cm$^2$, which is more than 1,000 times greater than the electric current density of a metal, such as copper. However, because of a carbon nanotube's nanoscale cross-section, electrons generally propagate only along the tube's axis. Carbon nanotubes are generally one-dimensional conductors.

In various embodiments, the trim ring 14 may be electroplated only on its A-surface (the surface visible to the passenger when the trim ring 14 has been installed in the console 10 as part of the housing assembly 11).

Figure 8:
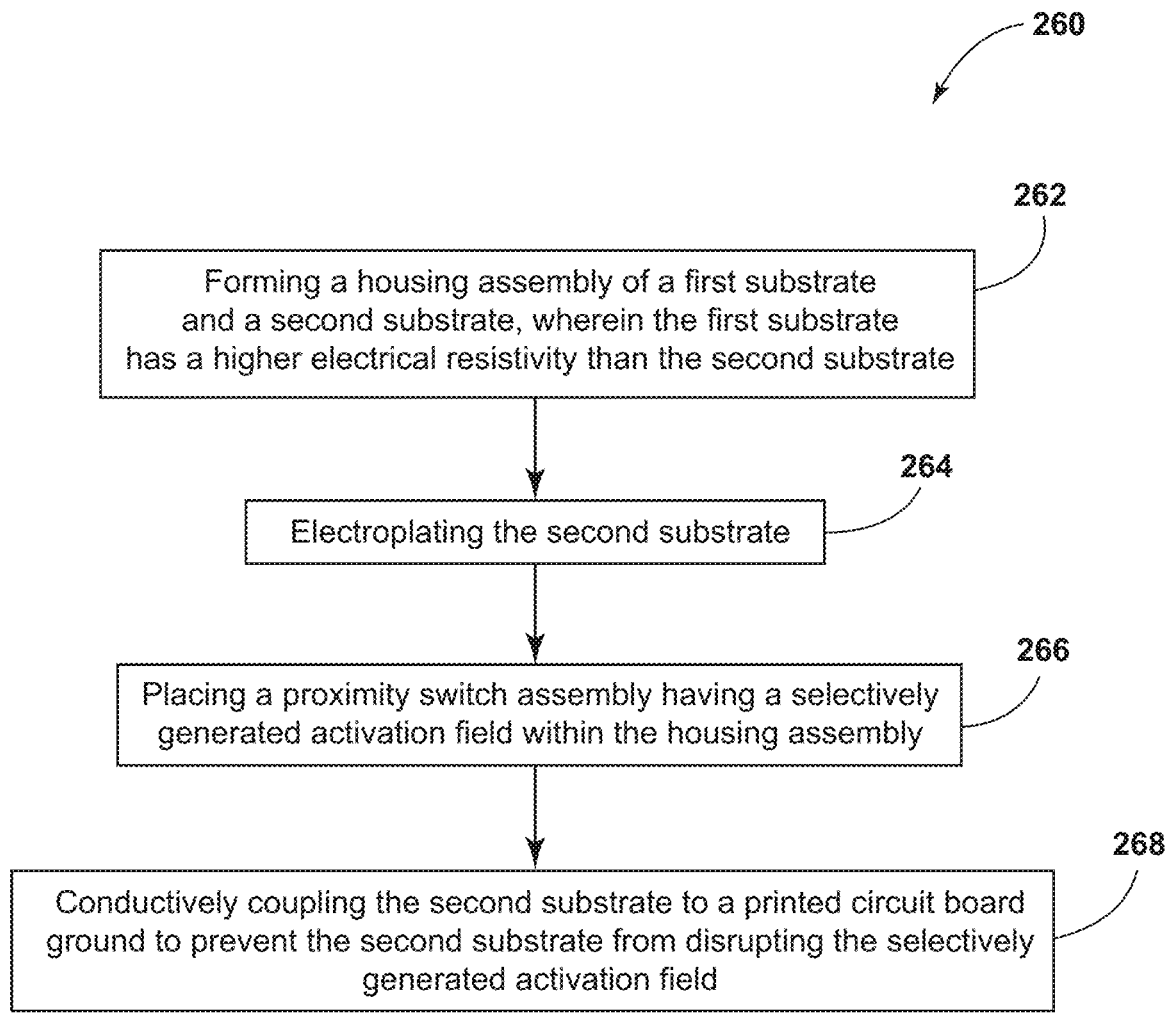
FIG. 8 is a flow diagram of a method for making a vehicular trim assembly, according to one embodiment.

FIG. 8 depicts a flowchart of a method 260 of making a vehicular trim assembly (e.g., housing assembly 11) of the depicted embodiment. The method 260 includes step 262 which provides for forming a housing assembly of a first substrate and a second substrate (improved platable ABS material 155), wherein the first substrate has a higher electrical resistivity than the second substrate. Step 264 provides for electroplating the second substrate, step 266 provides for placing a proximity switch assembly having a selectively generated activation field within the housing assembly, and step 268 provides for conductively coupling the second substrate to a printed circuit board ground to prevent the second substrate from disrupting the selectively generated activation field.

In various embodiments of the method of making a vehicular trim assembly, the first substrate (housing 12) is a non-platable ABS resin and the second substrate (trim ring 14 including heat stake pins 50) is improved platable ABS material 155. Referring to FIGS. 7A-7C, in various embodiments, electroplating the trim ring 14 of the second substrate includes etching a surface 172 of the conductive trim ring 14 with chromic acid, rinsing the etched surface 174, electroplating the etched surface 174 with a copper layer 190, electroplating the copper layer 190 with a semi-bright nickel layer 192, electroplating the semi-bright nickel layer 192 with the bright nickel layer 194, and electroplating the bright nickel layer 194 with a chrome layer 196.

The processing temperature, mold temperature, and injection speed are important to producing a part with good plating. During the molding process, a relatively hot melting temperature of approximately 245-270 degrees Celsius is typically required to reduce internal molding stresses. Conversely, a relatively cold mold temperature of approximately 65-80 degrees Celsius typically causes the plastic to have a thick skin with too little butadiene on the surface of the part. Too hot of a mold temperature enables more carbon black to reach the top surface, thus reducing the amount of etching. Injection speed is also important. Too fast of an injection speed tends to exhibit irregular surface patterns that are visible after chrome plating. Irregular types of surface patterns are generally called "gate blush" and "jetting." Other defects that can arise from excessive injection speeds are "splay" and "burning." All four of these types of defects greatly affect the part quality and will have an impact on yield. One way to minimize these types of defects is to reduce the injection speed as much as possible while still being able to achieve a completely filled part.

Generally, when the housing assembly 11 is made of a two shot molding process, it is desirable that the housing 12 and the trim ring 14 both be an ABS resin so that the housing 12 and the trim ring 14 have compatible molding parameters.

Referring again to FIG. 3, the visually appealing chrome surface 30 is disposed on trim ring 14 by electroplating metal layer 15 onto the A-surface of trim ring 14. The trim ring 14 includes heat stake pins 50. The improved platable ABS material 155 that the trim ring 14 is made of allows the heat stake pins 50 to ground the metal layer 15 through the conductive support 54 to the circuit board 52. In the depicted embodiment, the conductive support 54 includes four flanges 55. Each flange 55 has a hole 51 for receiving a heat stake pin 50 of trim ring 14. Heat stake pins 50 are inserted through tunnels 53 in housing 12. Thereafter, heat stake pins 50 are inserted into holes 51 in conductive support 54. Heat stake pins 50 are heat staked to the conductive support 54. Conductive support 54 electrically connects to circuit board 52 through towers 56 and 58 and through conductive rubber interfaces 88, 90 on towers 56 and 58 at connectors 100. The trim ring 14 metal layer 15 grounds to a grounded connection on the circuit board 52. In various embodiments, heat stake pins 50 may also be electroplated.

A variety of advantages may be derived by use of the present disclosure. The disclosed platable ABS resin (improved platable ABS material 155) is economic, has a low surface resistivity for plating, is conductive for grounding to circuit board 52 through support 54, and has an adequate melting point for heat staking to conductive support 54. A unique formulation of a very low percentage of expensive multi-walled carbon nanotubes with low cost carbon black has been developed in the improved platable ABS material 155 to achieve low surface resistivity and conductivity. Further, a two shot molding process may be used to minimize the use of the expensive improved platable ABS material 155 within housing assembly 11.

While the lamp assemblies 32 with proximity switches 34 and conductive trim ring 14 and housing 12 are shown located in an overhead console 10, it should be appreciated that the lamp assemblies 32 and proximity switches 34 with conductive trim ring 14 in a housing 12 may be located elsewhere on the vehicle 8, such as in the dash panel, on other consoles such as a center console, integrated into a touch screen display for a radio or infotainment system such as a navigation and/or audio display, or located elsewhere onboard the vehicle 8 according to various vehicle applications.

The proximity switches may be configured to control other devices. For example, proximity switches may control any of a number of vehicle devices and functions, such as controlling movement of a sunroof or moonroof, controlling movement of a moonroof shade, controlling activation of one or more lighting devices, and controlling various other devices and functions.

In various embodiments, the chrome layer 196 may be another material such as copper, nickel, black chrome, brass, or gold. Further, finishes such as bright, matte, and brushed may be applied to the trim ring 14 surface 30.

In various embodiments, the housing 12 and the trim ring 14 may be fabricated separately and press-fit or otherwise joined to make housing assembly 11. For example, the trim ring 14 may be made of the improved platable ABS material 155, and the housing may be made of another polymeric material such as ABS, polypropylene, polystyrene, or polyvinyl chloride.

In various embodiments, plated metal may be used for the trim ring 14. The plated metal trim ring 14 may be inserted into housing 12, and the plated metal trim ring 14 may be grounded to the circuit board 52.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A method of making a vehicular trim assembly comprising:
   forming a housing assembly of a first substrate and a second substrate, wherein the first substrate has a higher electrical resistivity than the second substrate;
   electroplating the second substrate;
   placing a proximity switch assembly having a selectively generated activation field within the housing assembly; and
   conductively coupling the second substrate to a printed circuit board ground to prevent the second substrate from disrupting the selectively generated activation field.

2. The method of making a vehicular trim assembly of claim 1, wherein the first substrate is a first ABS material and the second substrate is second ABS material comprising approximately 0.5% to approximately 2% volume multi-walled carbon nanotubes and approximately 4% to approximately 6% volume high aspect ratio carbon black and having a surface resistivity of approximately $0.8 \times 10^5$ ohm/sq to approximately $1.2 \times 10^5$ ohm/sq.

3. The method of making a vehicular trim assembly of claim 2, wherein forming the housing assembly of the first substrate and the second substrate further comprises:
   using a two shot molding process to form the housing assembly of the first substrate and the second substrate.

4. The method of making a vehicular trim assembly of claim 1, wherein electroplating the second substrate further comprises:
   etching an A-surface of the second substrate with chromic acid;
   rinsing the A-surface;
   coating the A-surface with copper;
   coating the copper with nickel; and
   coating the nickel with chrome.

5. The method of making a vehicular trim assembly of claim 1, wherein conductively coupling the second substrate to the printed circuit board ground to prevent the second substrate from disrupting the selectively generated activation field comprises disposing a plated signal line between the printed circuit board ground and a conductive rubber interface.

6. The method of making a vehicular trim assembly of claim 5, wherein disposing a plated signal line between the printed circuit board ground and the conductive rubber interface incudes using a conductive rubber interface having a gold-plated metal wire disposed in silicone rubber.

7. A method of making a vehicular trim assembly comprising:
   forming a housing assembly of a first substrate and a second substrate, wherein the first substrate has a higher electrical resistivity than the second substrate; and
   electroplating the second substrate, wherein electroplating the second substrate further comprises:
   etching a surface of the second substrate with chromic acid;
   rinsing the surface;
   coating the surface with copper;
   coating the copper with nickel; and
   coating the nickel with chrome.

8. A method of making a vehicular trim assembly comprising:
   forming a housing assembly of a first substrate and a second substrate, wherein the first substrate has a higher electrical resistivity than the second substrate; and
   electroplating the second substrate,
   wherein forming the housing assembly of the first substrate and the second substrate further comprises:
   using a two shot molding process to form the housing assembly of the first substrate and the second substrate.

9. A method of making a vehicular trim assembly comprising:
   forming a housing assembly of a first substrate and a second substrate, wherein the first substrate has a higher electrical resistivity than the second substrate, wherein the housing assembly comprises a trim ring disposed over a periphery of a housing, and wherein the trim ring comprises a polymeric material and is electrically conductive and grounded; and
   electroplating the second substrate.

10. The method of making a vehicular trim assembly of claim 9 further comprising placing a proximity switch assembly in the housing, the proximity switch assembly comprising a proximity sensor proximate a sensing pad for generating an activation field, wherein the sensing pad is proximate to the trim ring.

11. The method of making a vehicular trim assembly of claim 10, wherein the housing assembly is for a proximity sensor.

12. A method of making a vehicular trim assembly comprising:
- forming a housing assembly of a first substrate and a second substrate, wherein the first substrate has a higher electrical resistivity than the second substrate, wherein the housing assembly comprises a trim ring disposed over a periphery of a housing, wherein the trim ring comprises a polymeric material and is electrically conductive and grounded;
- electroplating the second substrate; and
- placing a proximity switch assembly in the housing, the proximity switch assembly comprising a proximity sensor proximate a sensing pad for generating an activation field, wherein the sensing pad is proximate to the trim ring.

\* \* \* \* \*